(12) United States Patent
Hill et al.

(10) Patent No.: US 10,218,827 B2
(45) Date of Patent: Feb. 26, 2019

(54) HOUSING FEATURES OF AN ELECTRONIC DEVICE

(71) Applicant: Apple Inc., Cupertino, CA (US)

(72) Inventors: Matthew D. Hill, Santa Clara, CA (US); Derek C. Krass, Cupertino, CA (US); Benjamin Shane Bustle, Cupertino, CA (US); Lucy Elizabeth Browning, Cupertino, CA (US); Michael Benjamin Wittenberg, Cupertino, CA (US); James B. Smith, Cupertino, CA (US); Ashutosh Y. Shukla, Cupertino, CA (US); Scott A. Myers, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/449,797

(22) Filed: Mar. 3, 2017

(65) Prior Publication Data
US 2017/0279943 A1  Sep. 28, 2017

Related U.S. Application Data

(63) Continuation of application No. 14/618,744, filed on Feb. 10, 2015, now Pat. No. 9,591,110, which is a (Continued)

(51) Int. Cl.
*H04B 1/38* (2015.01)
*H04M 1/02* (2006.01)

(52) U.S. Cl.
CPC .............................. *H04M 1/0249* (2013.01)

(58) Field of Classification Search
CPC ......... H04M 1/0249; H04M 1/02; H04M 1/23
See application file for complete search history.

(56) References Cited

U.S. PATENT DOCUMENTS

2005/0024278 A1  2/2005  Amemiya et al.
2005/0059444 A1  3/2005  Martinez et al.
(Continued)

FOREIGN PATENT DOCUMENTS

CN  102316687  1/2012
CN  102484308  5/2012
(Continued)

OTHER PUBLICATIONS

International Search Report and Written Opinion, PCT Application No. PCT/US2015/015127, dated Jun. 8, 2015.

*Primary Examiner* — Tuan Pham
(74) *Attorney, Agent, or Firm* — Brownstein Hyatt Farber Schreck, LLP

(57) ABSTRACT

An enclosure and a method for forming an enclosure are disclosed. The enclosure may be formed from metal, such as aluminum, and further include a non-metal portion allowing for transmission and receipt of electromagnetic waves. The non-metal portion may be interlocked to the enclosure and in particular, to a region within the enclosure including a first material having a relatively high strength and stiffness compared to the non-metal portion. Interlocking means may include forming dovetail cuts into the enclosure to receive the non-metal portion, a hole or cavity drilled into the enclosure which includes internal threads, and a rod inserted into the first material to provide a tension to the non-metal portion. Methods of assembling internal components using anodization are also disclosed.

20 Claims, 16 Drawing Sheets

Related U.S. Application Data continuation of application No. PCT/US2015/015127, filed on Feb. 10, 2015.

(60) Provisional application No. 62/047,466, filed on Sep. 8, 2014.

(56) References Cited

U.S. PATENT DOCUMENTS

| | | |
|---|---|---|
| 2007/0008227 A1 | 1/2007 | Napoles et al. |
| 2009/0036174 A1* | 2/2009 | Brandenburg ....... H04B 1/3888 455/575.1 |
| 2009/0149225 A1* | 6/2009 | Yokota ................. H04M 1/021 455/575.3 |
| 2012/0170213 A1* | 7/2012 | Raff ..................... G06F 1/1616 361/679.56 |
| 2013/0271902 A1 | 10/2013 | Lai |
| 2014/0098502 A1 | 4/2014 | Lasarov et al. |
| 2014/0128132 A1 | 5/2014 | Cox, III |
| 2014/0146992 A1 | 5/2014 | Jun |

FOREIGN PATENT DOCUMENTS

| | | |
|---|---|---|
| CN | 104009279 | 8/2014 |
| JP | 2003140775 | 5/2003 |
| JP | 2006304037 | 11/2006 |
| JP | 2007013784 | 1/2007 |

\* cited by examiner

HOUSING FEATURES OF AN ELECTRONIC DEVICE

CROSS-REFERENCE TO RELATED APPLICATION(S)

This application is a continuation patent application of U.S. patent application Ser. No. 14/618,744, filed Feb. 10, 2015 and titled Housing Features of an Electronic Device," which is a continuation patent application of International Patent Application No. PCT/US15/15127, filed Feb. 10, 2015 and titled "Housing Features of an Electronic Device," and Ser. No. 14/618,744 is a nonprovisional patent application of and claims the benefit of U.S. Provisional Patent Application No. 62/047,466, filed Sep. 8, 2014 and titled "Housing Features of an Electronic Device," the disclosures of which are hereby incorporated herein by reference in their entireties.

FIELD

The described embodiments relate generally to an electronic device. In particular, the present embodiments relate to housing features of the electronic device.

BACKGROUND

It is common for electronic devices to include an antenna or multiple antennas capable of receiving and/or transmitting electromagnetic ("EM") energy in the form of EM radio waves. Further, these electronic devices typically enclose the antenna(s) within a housing that also encloses several other components. In some cases, the housing is formed from a metal, such as aluminum, which may interfere with transmission and receipt of EM radio waves. In these cases, the housing may include a thin non-metal portion which allows EM radio waves to permeate through the housing. However, this presents several challenges. For example, securing the non-metal portion (such as plastic) to a metal housing may disengage, or deflect from, the metal housing if a load or force is exerted on the electronic device, such as during a drop event. Also, laminating the non-metal material is difficult in instances where the non-metal portion is relatively thin, as adhesive or other securing means tends to appear on the exterior surface of the housing, which is undesired.

The non-metal portion may also extend around a sidewall of the enclosure. In these locations (on the sidewall), the enclosure includes a space or void filled only with material used to form the non-metal portion. These locations also form part of a base that receives a display panel and cover glass. As a result, the display panel and the cover glass may subject the non-metal portion to breaking or cracking during a drop event.

SUMMARY

In one aspect, an enclosure is described. The enclosure may include a first region formed in an interior portion of the enclosure. The first region may include a first material filled or molded into the first region. The enclosure may further include a second region formed in an exterior portion of the enclosure. The second region may include a second material filled or molded into the exterior portion. The second material may be different than the first material. The enclosure may further include a protrusion integrally formed with the enclosure. The protrusion may extend through the first material. The enclosure may further include a means for interlocking the second material to the first material. In some cases, the first material engages the second material to define an interface region.

In another aspect, a method for assembling an electronic device is described. The method may include removing a first region of material in an interior portion of an enclosure. The method may further include filling the first region with a first material. The method may further include removing a second region of material in an exterior portion of the enclosure. The exterior portion defines an outer portion or region of the enclosure, and is opposite the interior portion that defines an inner portion that receives one or more internal components. The method may further include filling the second region with a second material different from the first material. The method may further include interlocking the second material to the first material.

In another aspect, an enclosure of an electronic device is described. The enclosure includes an interior portion that receives an internal component and an exterior portion that defines an outer region of the enclosure. The enclosure may include a first sidewall. The enclosure may include a second sidewall opposite the first sidewall. The enclosure may include a first region formed in the internal portion. In some cases, the first region extends from the first sidewall to the second sidewall; the first region may include a first material within the first region. The enclosure may further include a second region formed in the exterior portion. In some cases, the second region extends from the first sidewall to the second sidewall. The second region may include a second material within the second region. The enclosure may further include a cavity that receives at least some of the second material. In some embodiments, the first material is engaged with the second material.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
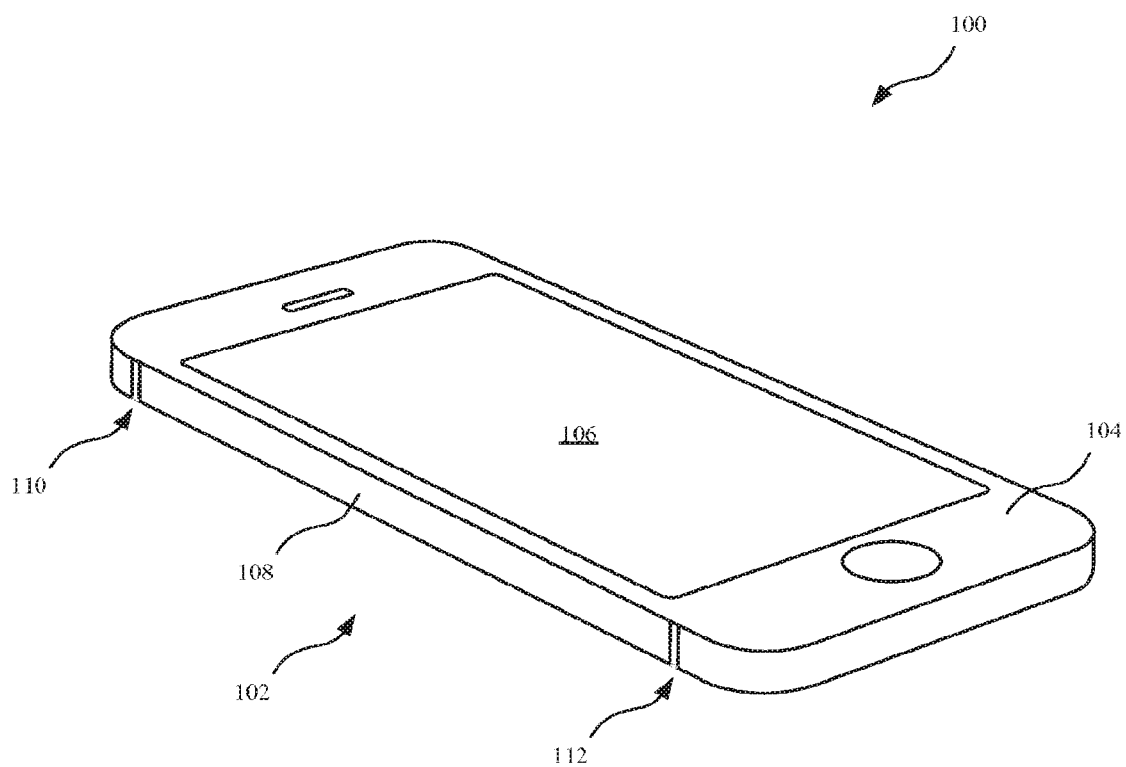
FIG. 1 illustrates an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an enclosure of an electronic device. In particular, the enclosure may be formed from a metal substrate, such as aluminum, and also from a non-metal material (or materials) through which electromagnetic ("EM") radio waves may pass. An interior portion, or interior surface, of the enclosure may include a first material molded into a first region formed by a material removal process that includes the use of a removal tool, such as a computer numerical control ("CNC") tool. An exterior portion, or exterior surface defined by an outer region of the enclosure, may include a second material molded into a second region. The second material may provide a cosmetic or aesthetic appearance to the enclosure. The first material may be formed from rigid materials such that the first material is relatively rigid or stiff with respect to the second material. The second material may engage or interlock with first material, thereby defining a region of the enclosure free of the metal substrate. In this manner, when the first material and the second material are made substantially from non-metallic materials, one or more radios (e.g. Wi-Fi radio, Bluetooth radio, cellular radio, NFC radio) within the electronic device may transmit and receive EM radio waves via antennas. As a result, the enclosure may be substantially formed from a robust metal yet include a cosmetic second material supported by a rigid or stiff first material, with the first and second materials allowing for permeation of EM radio waves.

The second material may be interlocked to the enclosure and/or the first material. In some embodiments, the enclosure includes a cavity, or several cavities, around a sidewall of the enclosure. The cavity may include internal threads. When the enclosure is filled with the second material, the second material, prior to curing, flows into the cavity and is further secured to the enclosure by the internal threads. Also, a rod member (or rod members) may be positioned within the first material prior curing the first material. When the first material cures, the rod member may provide not only additional stiffness but also a tension to the second material that may resist a load exerted on the second material, thereby providing improved securing means of the second material to the enclosure.

Also, in some embodiments, the enclosure includes several lines or symbols to assist with assembling various components within the electronic device. For example, the lines or symbols may provide a guide to an operator indicating where an internal component should be assembled. The lines and symbols may be formed by an anodization process. Further, in some embodiments, a portion of the line or symbol formed by the anodization process may be removed by laser-etching. Also, in cases where automated assembly of the electronic device is performed, the lines or symbols may indicate to a visual system (e.g., CCD camera) a location at which another internal component should be assembled. In this manner, the visual system may provide an input to a control system which signals to, for example, a robotic assembly to place an internal component at a desired location as determined by the visual system. This may provide for a highly repeatable process desired during assembly.

Also, in some embodiments, the second material extends around sidewalls of the enclosure to define split regions in which the sidewalls are free of the metal material forming the enclosure. In these embodiments, the second material may be strengthened. For example, in some embodiments, a material removal process may be formed in the sidewalls to define an extension (e.g., dovetail) that extends into and beyond the split region. In this manner, the second material may be filled or molded around the extension. Further, in some embodiments, a gusset may be molded (e.g., insert molded) into the second material. Also, in some embodiments, several rods or cylinders may be molded into the second material in a location associated with the split region.

These and other embodiments are discussed below with reference to FIGS. 1-28. However, those skilled in the art will readily appreciate that the detailed description given herein with respect to these Figures is for explanatory purposes only and should not be construed as limiting.

FIG. 1 illustrates an embodiment of electronic device 100, or simply device 100. In some embodiments, device 100 is a mobile telecommunications device, such as an iPhone® from Apple, Inc., of Cupertino, Calif. In some embodiments, device 100 is a tablet computing device, such as an iPad, from Apple, Inc., of Cupertino, Calif. Device 100 may include enclosure 102 that receives cover glass 104. In some embodiments, enclosure 102 is formed from a metal material, such as aluminum or aluminum alloy. Also, display panel 106 may be positioned between cover glass 104 and enclosure 102. Display panel 106 may be configured to transmit visual display content to a user. Also, in some embodiments, enclosure 102 includes a sidewall 108 having openings, such as first opening 110 and second opening 112. First opening 110 and second opening 112 may be filled by a non-metal material, such as plastic or resin. First opening 110 and second opening 112 may be referred as a split region, as these area define an area in which the sidewalls (e.g., sidewall 108) are discontinuous.

Figure 2:
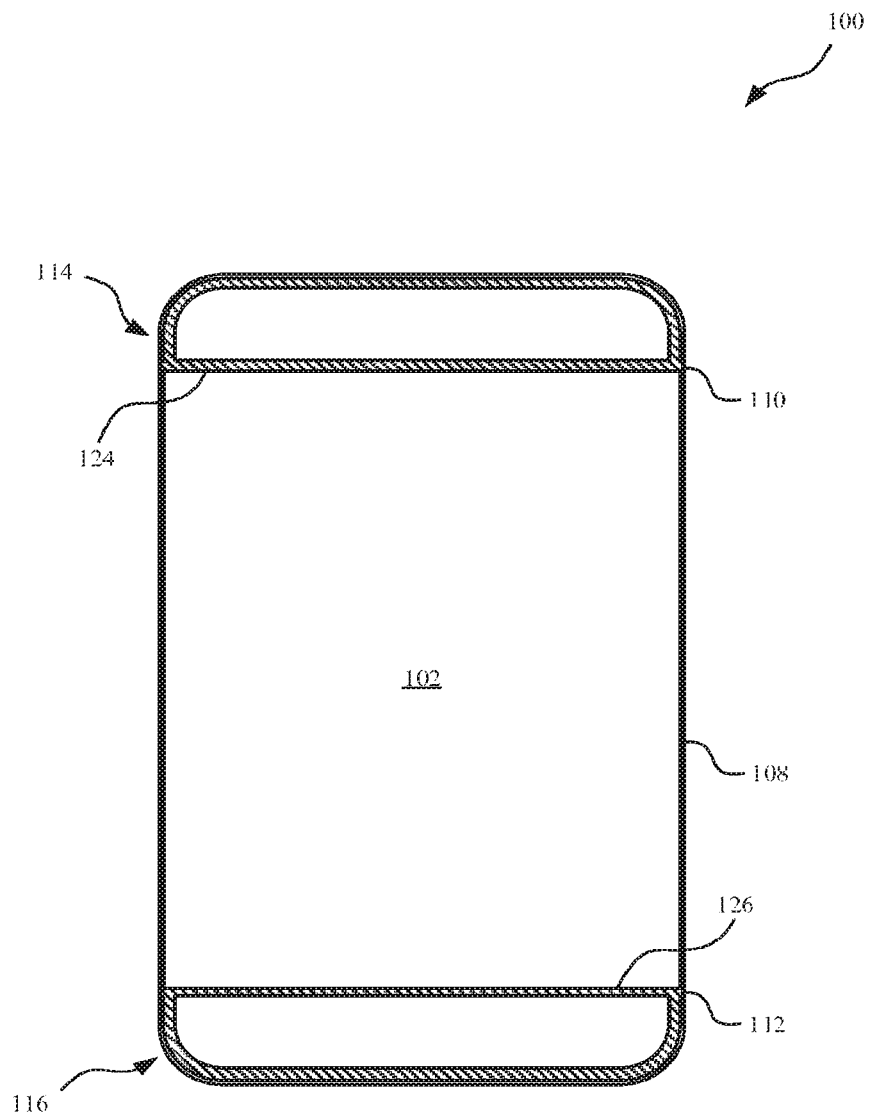
FIG. 2 illustrates a plan view of a rear portion of the electronic device shown in FIG. 1, showing an exterior portion of the enclosure.

FIG. 2 illustrates a rear portion of device 100 shown in FIG. 1, showing an exterior portion of enclosure 102. While enclosure 102 is formed substantially from a unitary material (e.g. metal), enclosure 102 may include several regions generally free of the unitary material. For example, enclosure 102 may include first outer region 114 and second outer region 116. In some embodiments, first outer region 114 and second outer region 116 are formed from a material removal process by cutting or removing material from enclosure 102. Further, first outer region 114 and second outer region 116 may include first outer material 124 and second outer material 126 positioned within first outer region 114 and second outer region 116, respectively. In some embodiments, first outer material 124 and second outer material 126 are molded within first outer region 114 and second outer region 116, respectively, after the material removal process.

Also, in some embodiments, first outer material 124 and second outer material 126 are formed from a non-metal material, such as plastic. In this manner, device 100 may include a radio, not shown, positioned behind first outer region 114 and/or second outer region 116 (i.e., within device 100). The radio may include an antenna that transmits or receives EM waves, such as radio waves, through a substantially metal enclosure 102 via first outer material 124 and second outer material 126. Generally, first outer material 124 and second outer material 126 may be formed from the same or substantially similar composition of materials, with the composition of materials allowing EM waves used for telecommunications, data transfer, or the like. Also, FIG. 2 shows first outer material 124 and second outer material 126 extending around the sidewalls of enclosure 102. For example, first outer material 124 extends around sidewall 108 and into first opening 110, while second outer material 126 extends around sidewall 108 and into second opening 112. Also, first outer material 124 and second outer material 126 may include a variety of colors, such as red, blue, green, black, white, or a combination thereof. Generally, the color or colors selected provides a desired aesthetic appearance.

Figure 3:
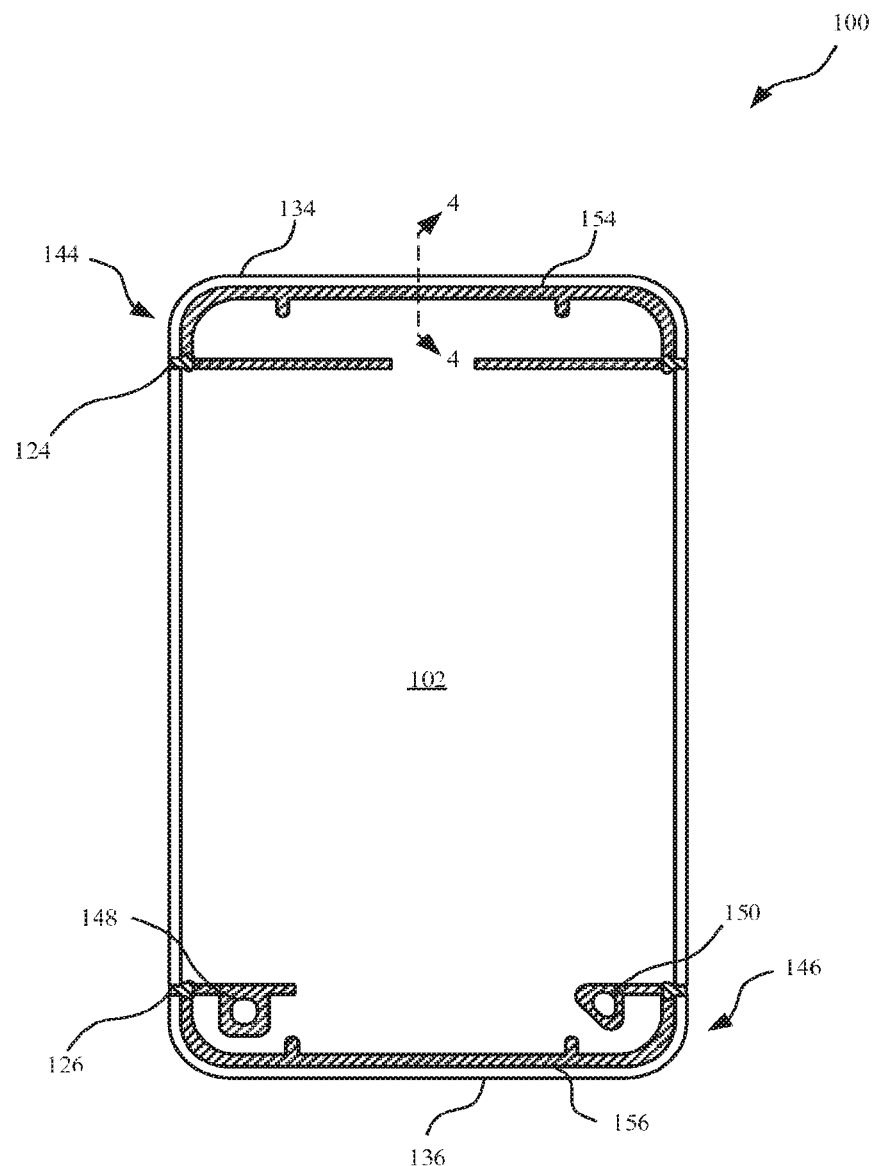
FIG. 3 illustrates a plan view of a front portion the electronic device shown in FIG. 1, showing an interior portion of the enclosure.

FIG. 3 illustrates a plan view of device 100 showing an interior portion of enclosure 102. For purposes of illustration, several internal components (e.g., processor circuits, memory circuits, flexible circuits, battery, etc.) are removed. Similar to the exterior portion, the interior portion may include several regions free of the unitary material used to form enclosure 102, such as first inner region 144 and second inner region 146. First inner region 144 and second inner region 146 may be formed by a material removal process previously described for first outer region 114 and second outer region 116 (shown in FIG. 2). However, the respective regions may include different shapes. In some embodiments, first inner region 144 and second inner region 146 are cut by a substantially similar code input into a cutting tool. In the embodiment shown in FIG. 3, first inner region 144 is different from second inner region 146. For example, second inner region 146 includes first protrusion 148 and second protrusion 150, both of which may be integrally formed with enclosure 102. In other words, first protrusion 148 and second protrusion 150 may be formed from (i.e., cut into) the same substrate used to make enclosure 102. In other embodiments, first inner region 144 also includes protrusions.

First inner region 144 and second inner region 146 may include first inner material 154 and second inner material 156 positioned within first inner region 144 and second inner region 146, respectively. As shown, first inner region 144 is proximate to sidewall 134 and second inner region 146 is proximate to sidewall 136. In some embodiments, first inner material 154 and second inner material 156 are formed by a molding process within first inner region 144 and second inner region 146, respectively. Also, in some embodiments, first inner material 154 and second inner material 156 are formed form a different composition of materials than that of first outer material 124 and second outer material 126 (shown in FIG. 2). In the embodiments shown in FIG. 3, first inner material 154 and second inner material 156 are formed from the same or substantially similar composition of materials, and may include a plastic or resin material combined with particles including glass, metal (e.g., aluminum), or a combination thereof. As a result, first inner material 154 and second inner material 156, when cured, form a relatively rigid and stiff structure configured to provide support to first outer material 124 and second outer material 126, respectively. Also, the composition of materials used to form first inner material 154 and second inner material 156 allows transmission of EM radio waves. Accordingly, first outer material 124 and first inner material 154 may combine to allow EM waves to be transmitted or received by a radio antenna located within enclosure 102. A similar EM transmission/reception may occur via second outer material 126 and second inner material 156.

FIGS. 4-11 illustrate a cross sectional view of the embodiment shown in FIG. 3 taken along the 4-4 line, showing various features and embodiments that may be used to form enclosure 102. In some cases, FIGS. 4-11 illustrate various steps in forming enclosure 102. However, while these features are shown directed to a particular location along first inner region 144 of enclosure 102 (the cross sectional region of FIG. 3), these features and embodiments may be located in any region along sidewall 134 and/or sidewall 136 (shown in FIG. 3).

Figure 4:
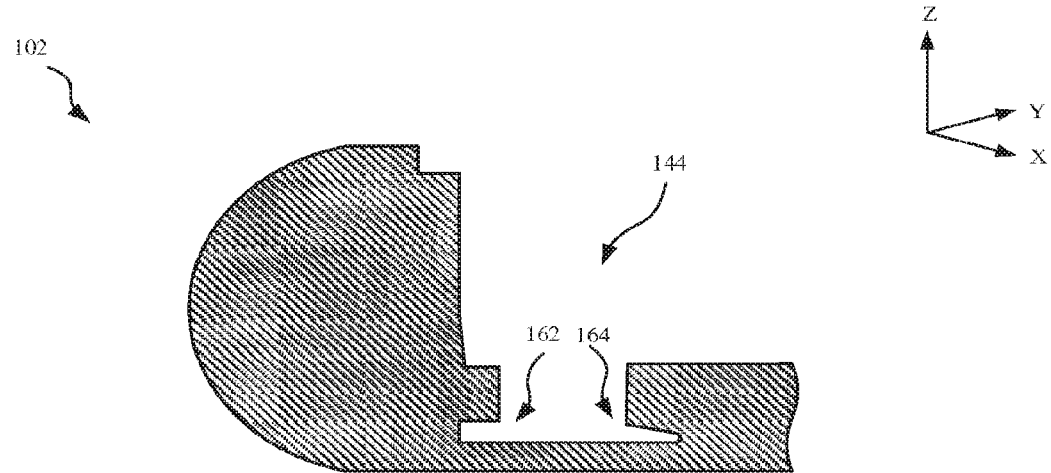
FIG. 4 illustrates a cross sectional view of the enclosure shown in FIG. 3 taken along the 4-4 line, showing the enclosure having material removed from the enclosure to define a first inner region in which a first inner material may be received.

FIG. 4 illustrates a cross sectional view showing enclosure 102 having material removed from enclosure 102 to define first inner region 144 in which a first inner material may be received. In some embodiments, first inner region 144 includes first indention 162 and second indention 164. In some embodiments, first indention 162 and second indention 164 form a dovetail configuration that secures the inner material filled or molded within first inner region 144. Also, although not shown, second indention 164 may be positioned beneath a protrusion configured to further secure filled or molded material to first inner region 144.

Figure 5:
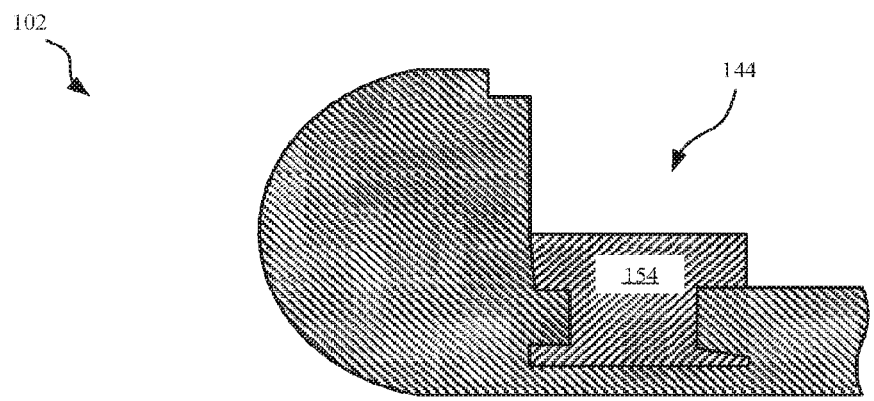
FIG. 5 illustrates a cross sectional view of the enclosure shown in FIG. 4, further showing the first inner material filled within the first inner region.

FIG. 5 illustrates a cross sectional view of enclosure 102 shown in FIG. 4, further showing first inner material 154 positioned within first inner region 144. First inner material 154 may be applied by molding, including injection molding, printing, or any technique known in the art for applying a resin or plastic material to a metallic enclosure.

Figure 6:
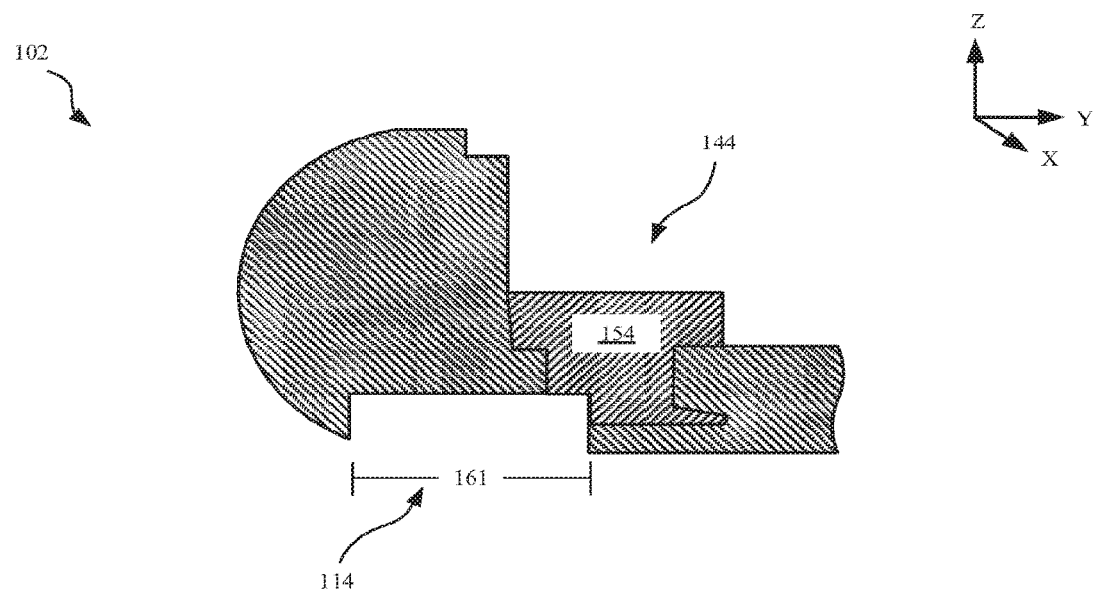
FIG. 6 illustrates a cross sectional view of the enclosure shown in FIG. 5, further showing the enclosure having undergone an additional material removal process to define a first outer region.

FIG. 6 illustrates a cross sectional view of enclosure 102 shown in FIG. 5, further showing enclosure 102 having undergone an additional material removal process to define first outer region 114 (previously shown in FIG. 2). In some embodiments, first inner region 144 and first outer region 114 are formed prior to adding first inner material 154. In the embodiment shown in FIG. 6, first inner region 144 receives first inner material 154 prior to forming first outer region 114. In this manner, a portion of first inner material 154 may be removed during the process used to form first outer region 114. Also, first outer region 114 may include thickness 161 in a direction (e.g., y-direction) approximately in the range of 1.5 to 3 mm. Also, first outer region 114 may be in a location associated with any of the four sidewalls of enclosure 102 (such as sidewall 134 or sidewall 136).

Figure 7:
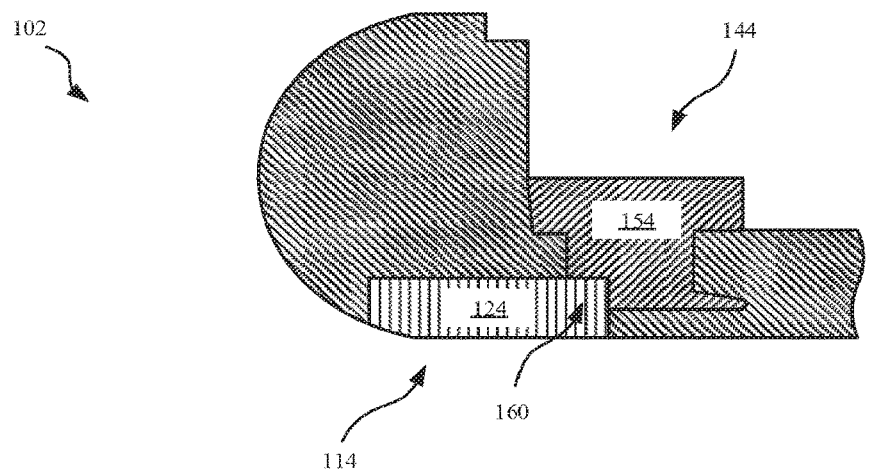
FIG. 7 illustrates a cross sectional view of the enclosure shown in FIG. 6, further showing a first outer material positioned within the first outer region.

FIG. 7 illustrates a cross sectional view of enclosure 102 shown in FIG. 6, further showing first outer material 124 positioned within first outer region 114. Along with the various color combinations, first outer material 124 may further include a desired aesthetic or cosmetic look and feel by being formed within first outer region 114 in a manner such that first outer material 124 is substantially co-planar, or flush, with respect to an exterior portion of enclosure 102. Also, first outer material 124 may be applied to enclosure 102 in any manner described for first inner material 154. Also, as shown in FIG. 7, first outer material 124 is engaged with first inner material 154 defining an interface region 160. The interface region 160 may be referred to as a region of enclosure 102 substantially free of the metal substrate used to form enclosure 102. Due in part to the substantial non-metal compositions of first outer material 124 and first inner material 154, transmission of EM waves may pass to and from the electronic device at the interface region 160 despite enclosure 102 being formed of a substantially unitary metal substrate. This includes instances in which first inner material 154 includes some metallic particles.

Figure 8:
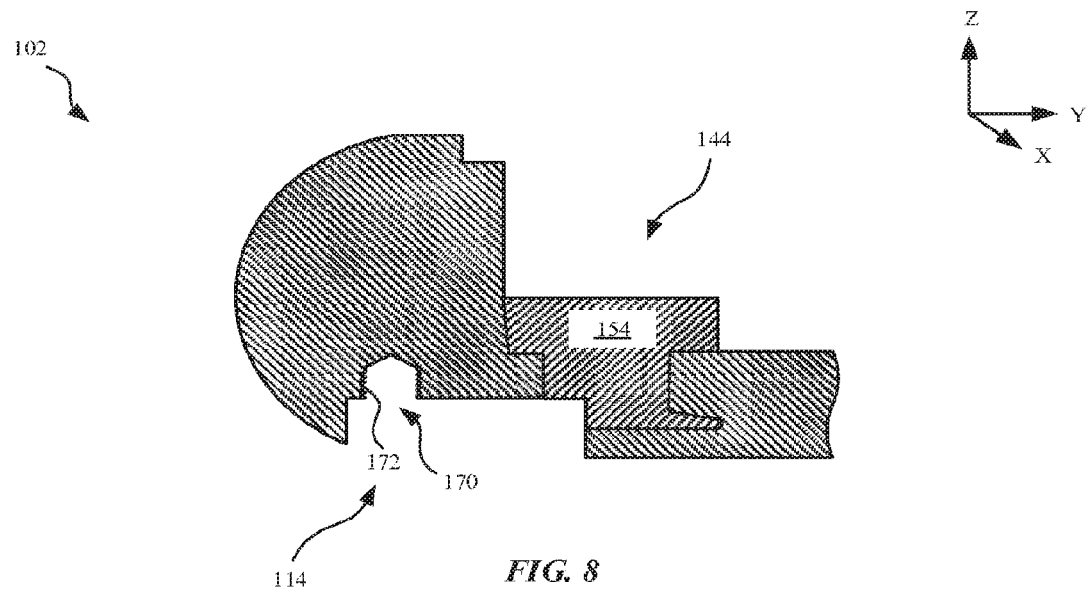
FIG. 8 illustrates a cross sectional view of the enclosure showing the enclosure having a cavity drilled into the enclosure, the cavity including a threaded region, in accordance with the described embodiments.
Figure 9:
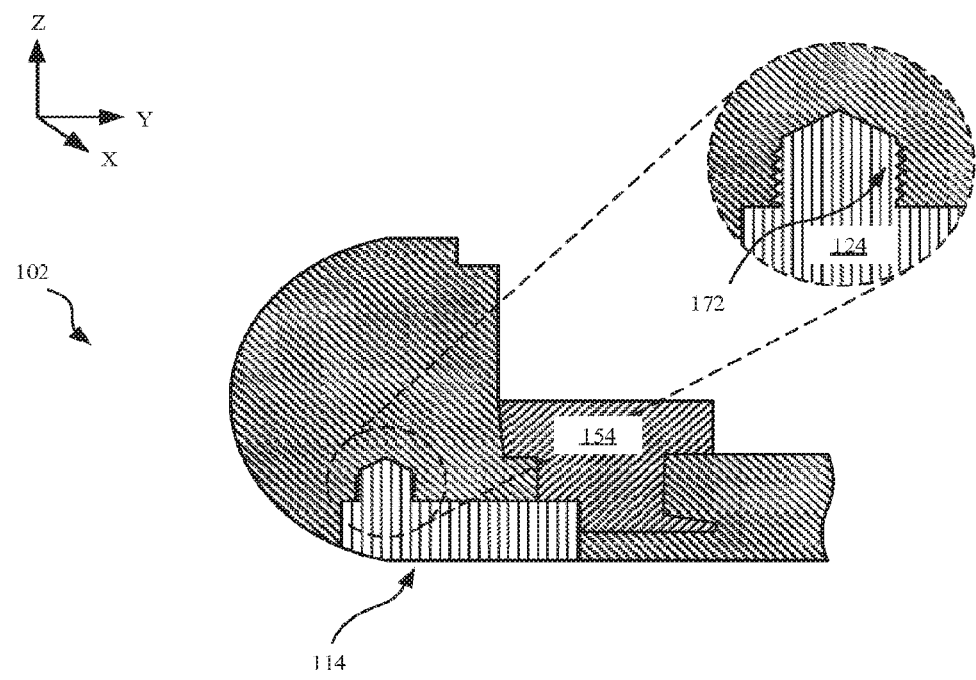
FIG. 9 illustrates a cross sectional view of the enclosure showing the cavity shown in FIG. 8, with the first outer material filling the cavity and the threaded region.

In instances when first outer material 124 is not adhesively secured to enclosure 102 and/or first inner material 154, additional features may be used to prevent first outer material 124 from disengaging or deflecting outward (with respect to enclosure 102) during a load or force acting on enclosure 102. For example, FIGS. 8 and 9 illustrate a cross sectional view of enclosure 102 having cavity 170 formed within enclosure 102, and in particular, within first outer region 114. Cavity 170 may also be positioned within at least a portion of a sidewall of enclosure 102. Cavity 170 may be formed by a material removal tool, such as a drill or pilot drill. In some embodiments, cavity 170 includes internal threads 172. FIG. 9 illustrates first outer material 124 positioned or molded within first outer region 114, and also in a manner such that first outer material 124 fills cavity 170 and internal threads 172 prior to first outer material 124 curing. In the enlarged view in FIG. 9, once first outer material 124 cures, first outer material 124 includes a virtual threaded screw integrally formed with first outer material 124. This feature may secure first outer material 124 from outward deflection caused by a load or force received by enclosure 102 in the x-, y-, and/or z-directions. Also, although not shown, a cavity having internal threads may be formed within enclosure 102, thereby providing additional securing means for first inner material 154 to enclosure 102 in a manner similar to that of first outer material 124. Further, in some embodiments, two or more cavities (similar to cavity 170) having internal threads may be formed within enclosure 102, such that screw-like features are integrally formed with first outer material 124 and/or first inner material 154.

Figure 10:
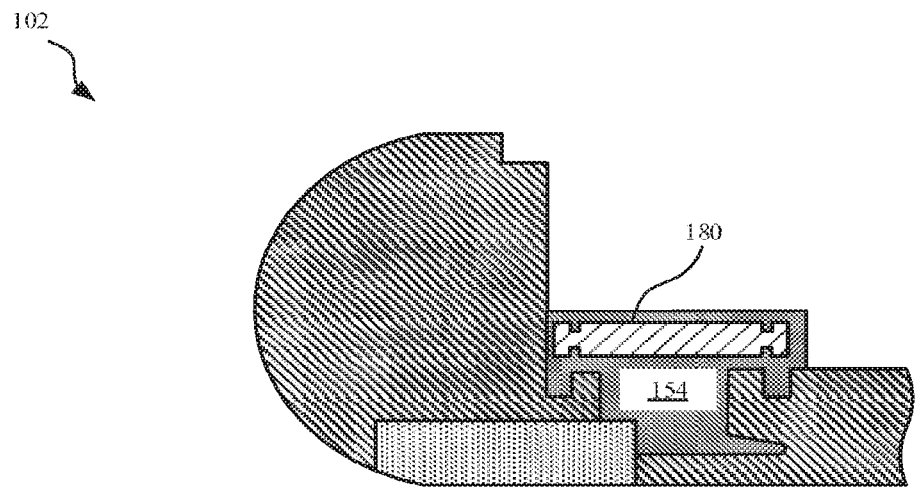
FIG. 10 illustrates a cross sectional view of the enclosure shown in FIG. 9, having a first inner material with a rod member positioned within the first inner material, in accordance with the described embodiments.

In some embodiments, first inner material 154 may be configured to provide additional securing features. For example, FIG. 10 illustrates a cross sectional view of enclosure 102 having first inner material 154 with a rod member 180 positioned within first inner material 154. In some embodiments, rod member 180 is formed from a ceramic material. Generally, rod member 180 may be made from any material or materials that do not interfere with transmission of EM waves. Also, in some embodiments, rod member 180 is insert molded into first inner material 154. In other words, rod member 180 is positioned within first inner material 154 during a molding process of first inner material 154 and prior to curing thereof. In other embodiments, rod member 180 includes a threaded region at a single end or at both ends. Rod member 180 may be configured to provide a "pre-tension" on first outer material 124, particularly in areas proximate to first opening 110 and/or second opening 112 (shown in FIG. 1). The term "pre-tension" refers to a tension or stress that may be in a direction opposite a direction of a load or force exerted on enclosure 102 and/or first outer material 124. In this manner, rod member 180 may offset a deflection force acting on first outer material 124 which increases the probability of first outer material 124 remaining intact. Rod member 180 may also act as a rebar providing additional strength to first inner material 154. Also, in some embodiments, rod member 180 may be heated in order to expand from a first volume to a second volume greater than the first volume. While heated, rod member 180 is insert molded into first inner material 154. When rod member 180 cools, it may shrink to the first volume. However, while doing so, it may also shrink first inner material 154 to provide additional tension.

Figure 11:
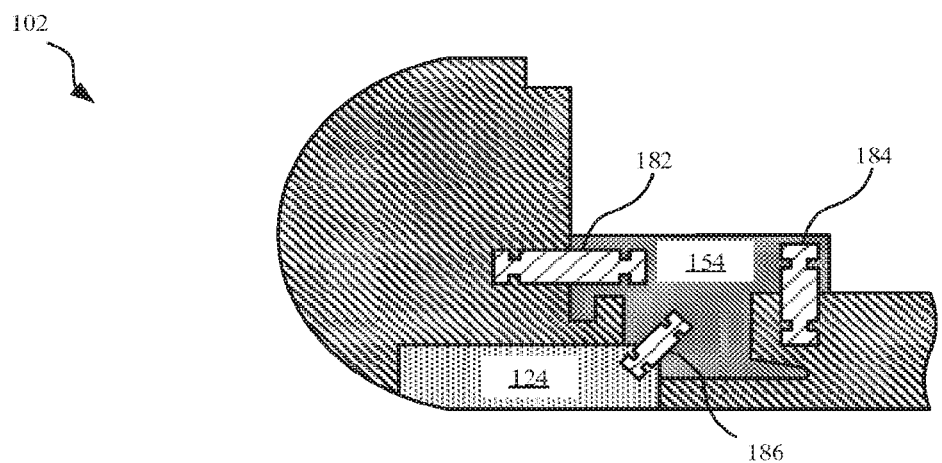
FIG. 11 illustrates a cross sectional view of the enclosure shown in FIG. 9, showing a rod member used in various configurations, in accordance with the described embodiments.

FIG. 11 illustrates a cross sectional view of enclosure 102 showing multiple rod members used in various configurations. For example, in some embodiments, enclosure 102 may include several cavities or openings allowing first rod member 182 and second rod member 184 to be fastened or secured to the cavities or openings of enclosure 102, which may provide additional securing means for first inner material 154 to enclosure 102. Also, in some embodiments, third rod member 186 may be insert molded in both first inner material 154 and first outer material 124 thereby providing a physical interlock between first inner material 154 and first outer material 124. Also, in some embodiments (not shown), the cavities used to receive the rod members may be threaded. In these embodiments, rod members (not shown) may also be threaded and configured for threaded engagement with the cavities. Further, first rod member 182, second rod member 184, and/or third rod member 186 can be used in any configuration that does not close an electrical connection between otherwise non-electrically connected components.

Figure 12:
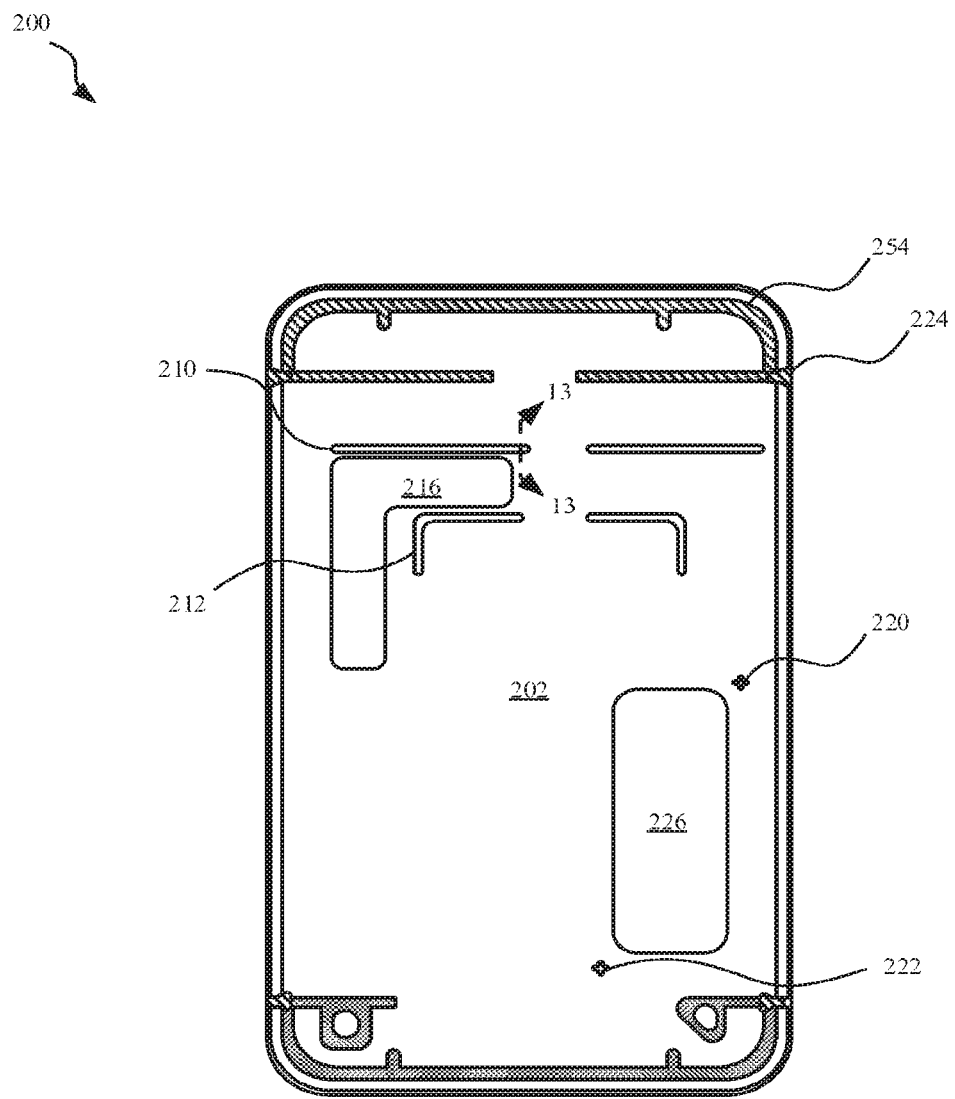
FIG. 12 illustrates a plan view of an electronic device showing an interior portion of an enclosure, further showing several marks and symbols used as guides for assembling internal components within the enclosure, in accordance with the described embodiments.

FIG. 12 illustrates a plan view of electronic device 200 showing an interior portion of enclosure 202, further showing several marks and symbols used as guides for assembling internal components within enclosure 202, in accordance with the described embodiments. For example, enclosure 202 may include first mark 210 and second mark 212 used in concert as guides for first internal component 216, which may be an internal component, such as a processor or a flexible circuit. In some embodiments, first mark 210 and second mark 212 are located in an area of enclosure 202 on opposite sides of first internal component 216 in order to act as a guide for positioning first internal component 216. Also, enclosure 202 may further include third mark 220 and fourth mark 222 used in concert as guides for second internal component 226, which may include an internal power supply. Third mark 220 and fourth mark 222 may be selected from various visual symbols, such as a circle, triangle, or a four-sided figure (e.g., rectangle). In the embodiment shown in FIG. 12, third mark 220 and fourth mark 222 are both in the shape of a plus ("+") sign. In other embodiments, third mark 220 includes a shape different from that of fourth mark 222.

In addition to acting as guides for an assembly operator, first mark 210, second mark 212, third mark 220, and/or fourth mark 222 may be used as fiducial markers used by a vision or imaging system (not shown) that is part of an automated assembly machine (not shown). In this manner, the vision system may detect any of first mark 210, second mark 212, third mark 220, and/or fourth mark 222, and provide an input to the assembly machine, the input referring to a location on enclosure 202. The assembly machine may then output a signal to a robotic arm carrying, for example, second internal component 226. The assembly machine may be configured to position second internal component 226 in a location between third mark 220 and fourth mark 222. These marks shown in FIG. 12 offer greater repeatability in assembly over using other internal features or previously assembled components within device 200, particularly when using an automated assembly process having a vision system.

Also, in some embodiments, first mark 210, second mark 212, third mark 220, and fourth mark 222 are formed by an anodizing process. Further, to allow the vision system to first distinguish the aforementioned marks from "false positives" which may include machining marks form by a CNC tool, first mark 210, second mark 212, third mark 220, and fourth mark 222 may include a laser etching to remove a portion of the marks.

Figure 13:
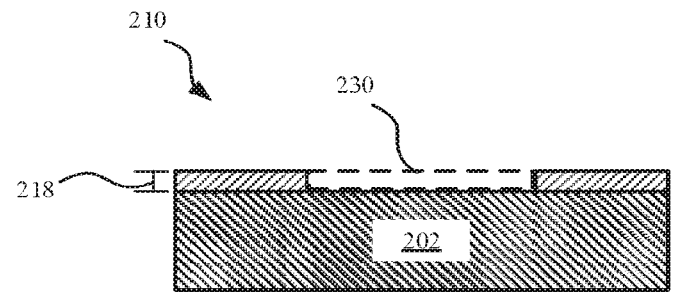
FIG. 13 illustrates a cross sectional view of an exemplary first mark shown in FIG. 12, taken along the 13-13 line.

FIG. 13 illustrates a cross sectional view of an exemplary first mark 210 shown in FIG. 12, taken along the 13-13 line. First mark 210 can be formed by laser etching portions of an anodic film formed on enclosure 202 that is anodized, in order to define first mark 210. In some embodiments, a laser beam is rastered over the anodic film in order to form first mark 210. In this manner, the laser etched portions define regions where the anodic film is removed. The laser etching process may recess first mark 210 relative to remaining surfaces of enclosure 202. This recessed portion may include a height 218 approximately in the range of 8-15 micrometers. The region 230 (dotted lines) refers to a space previously occupied by first mark 210 and removed by the laser removal process. This may be used to further assist a vision system in distinguishing first mark 210 from another feature of enclosure 202, including second mark 212.

Figure 14:
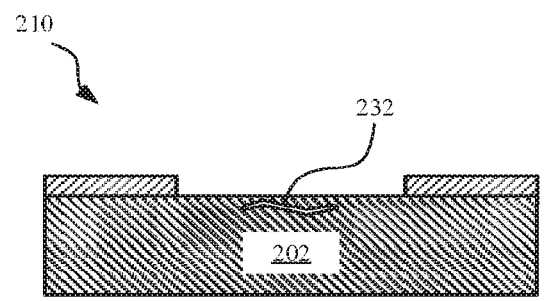
FIG. 14 illustrates a cross sectional view of an exemplary first mark shown in FIG. 13, further having a laser etched mark within the enclosure.
Figure 15:
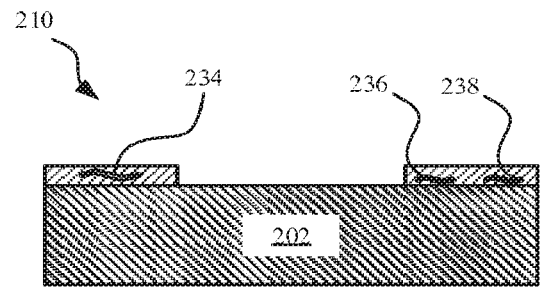
FIG. 15 illustrates a cross sectional view of an exemplary first mark shown in FIG. 13, further undergoing a crazing process in which laser etched marks are made within an anodized region.

FIGS. 14 and 15 illustrate alternative embodiments of first mark 210 having different laser etched features. In FIG. 14, after a portion of first mark 210 is removed, a laser etch tool may form a laser etch mark 232 between a region defining first mark 210 and below a surface of enclosure 202 which may be recognized in a unique and distinct manner by a vision system previously described.

FIG. 15 illustrates a crazing process in which laser etched marks are made within first mark 210. In other words, a laser etching process may be performed on an anodized region. For example, first mark 210 includes first laser etch mark 234 in a central region of first mark 210. Also, first mark 210 includes second laser etch mark 236 and third laser etch mark 238, both of which are proximate to an interface region between first mark 210 and enclosure 202. This crazing process may be performed in a manner such that a vision system may distinguish first laser etch mark 234 from second laser etch mark 236 and third laser etch mark 238. It will be appreciated that any combination of laser etch marks shown in FIGS. 13-15 may be used on any of first mark 210, second mark 212, third mark 220, and fourth mark 222 shown in FIG. 12. Further, in the embodiments shown in FIGS. 13-15, the portion removed by a laser ablation process (e.g., region 230) may also serve as an electrical grounding path for some internal components electrically connected to the electrical grounding path. The electrical grounding path may be part of enclosure 202 (shown in FIG. 12) as the anodized regions surrounding the grounding path are (relatively) inert electrically. Also, the grounding path may be electrically connected to a grounding foam. In this manner, the grounding foam may be electrically connected to the internal component(s).

The anodization process previously described may be performed subsequent to molding, for example, first inner material 254 and first outer material 224 (shown in FIG. 12) to enclosure 202. Accordingly, first inner material 254 and first outer material 224 are exposed to the anodization process. This may be performed in order to improve the cosmetic appearance of enclosure 202 and/or improve the resistance of enclosure 202 to damage, such as scratching. In some cases, the anodization process is performed near the final assembly process of an electronic device. Generally, materials formed from plastic, such as first outer material 224 and first inner material 254, may be eroded when enclosure 202 undergoes an anodization "bath" that may include chemicals such as phosphoric acid, sulfuric acid, and/or oxalic acid, all of which may be heated to a temperature well above room temperature.

However, in the described embodiments, first outer material 224 and first inner material 254 include a unique plastic material or materials allowing first outer material 224 and/or first inner material 254 to resist erosion during the anodization process. Since anodizing generally involves immersing a part in an acidic electrolytic bath that can be heated, first outer material 224 and/or first inner material 254 should be resistant to chemical breakdown or other deformation when exposed to an acidic electrolytic bath. Further, first outer material 224 and first inner material 254 are designed to retain their original color and stiffness. This may be due in part to several features of first outer material 224 and first inner material 254. For example, first outer material 224 and first inner material 254 may each include a plastic material or materials free of hydroscopic materials that absorb water. In this manner, any water associated with the anodization bath will not be absorbed by first outer material 224 and first inner material 254. Further, the dimensions and tolerances of enclosure 202 (e.g., regions which receive first outer material 224 and first inner material 254) do not affect or disturb first outer material 224 and first inner material 254. Also, first inner material 254 may further include a material makeup such that a ridge feature (discussed below) does not become brittle or weak. In this manner, first inner material 254 remains strong enough to hold a display cover.

In some embodiments, first outer material 224 and/or first inner material 254 may be made from materials that include miscible blends of the Polyarylether Keytone (PAEK) family (PEEK, PEK, PEKK) and Polysulfone family (PSU, PPS, PES, PPSU, and PPS). These material compositions may include glass fibers to increase strength or adjust rheological properties to improve blend homogeneity. Further, the composition of materials forming first outer material 224 and/or first inner material 254 may be chemically resistant and retain their geometries when exposed to one or more additional processes subsequent to anodization. Such post-anodizing processes can include exposure to ultraviolet light (e.g., by exposure to an ultraviolet curing process), chemical coating, CNC cutting, blasting (e.g., sandblasting), and polishing. Other factors in determining the material(s) used to form first outer material 224 and/or first inner material 254 include strength sufficient to withstand impact during a drop event of enclosure 202, moldability of the material(s) (such that first outer material 224 and/or first inner material 254 can be properly molded within gaps and offsets of enclosure 202), and ability to form an external skin that is resistant to exposing internal portions of the polymer material.

Figure 16:
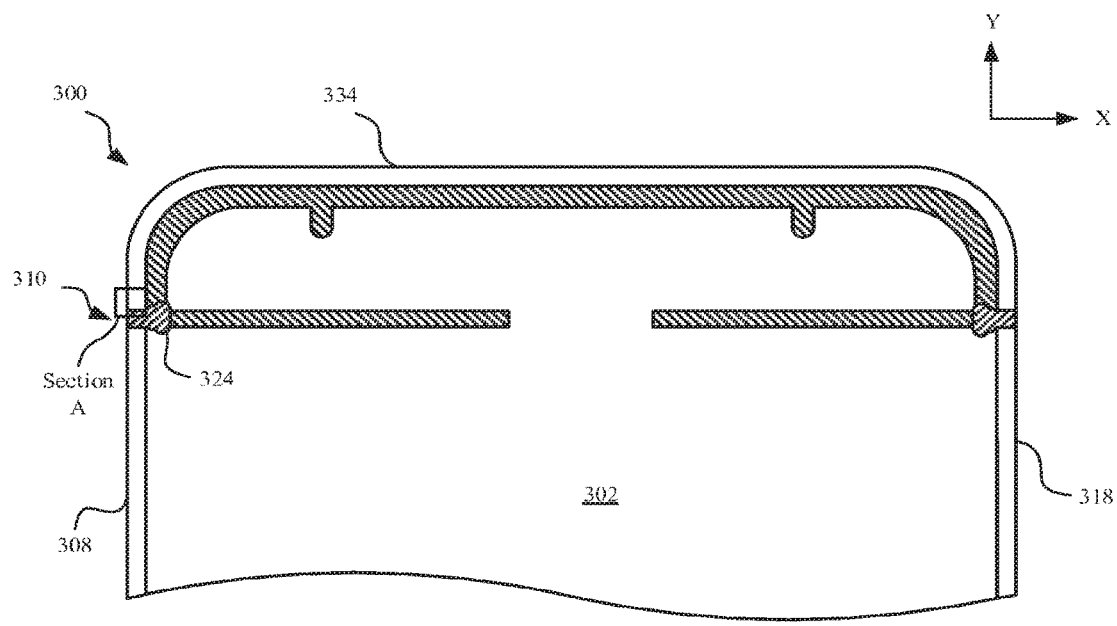
FIG. 16 illustrates a plan view of an enlarged area of an interior portion of an electronic device, in accordance with the described embodiments.

FIG. 16 illustrates a plan view of an enlarged area of an interior portion of device 300, in accordance with the described embodiments. Similar to previous embodiments, device 300 may include enclosure 302 having second sidewall 334 positioned between first sidewall 308 and third sidewall 318. Also, enclosure 302 may further include opening 310 that may be referred to as a split region within first sidewall 308. Opening 310 may be filled within first outer material 324 that may be an insert molded material formed on an exterior portion of enclosure 302 in a manner previously described.

Figure 17:
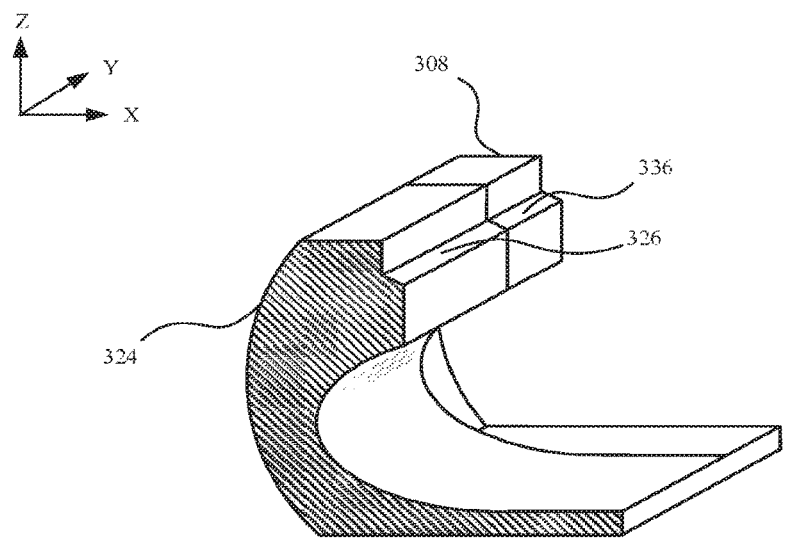
FIG. 17 illustrates an isometric side view of a region enclosed by Section A shown in FIG. 16, showing a first outer material and an upper sidewall including a first ridge feature and a second ridge feature, respectively.

FIG. 17 illustrates an isometric side view of a region enclosed by Section A shown in FIG. 16, showing first outer material 324 and first sidewall 308. As shown, first outer material 324 includes first ridge feature 326 and first sidewall 308 includes second ridge feature 336. First ridge feature 326 and second ridge feature 336 are designed to be substantially continuous such that a component (e.g., display panel 106, in FIG. 1) may lie flat, or level, on both first ridge feature 326 and second ridge feature 336. Due to their respective material compositions, first ridge feature 326 may include different properties than that of second ridge feature 336. For example, second ridge feature 336 may be relatively stiff or rigid as compared to first ridge feature 326, as second ridge feature 336 is formed from metal, such as aluminum, and first ridge feature 326 is formed from a material such as plastic. As a result, first ridge feature 326 may be prone to cracking, including micro-cracking, and/or breaking if enclosure 302 is exposed to certain load-bearing events.

Figure 18:
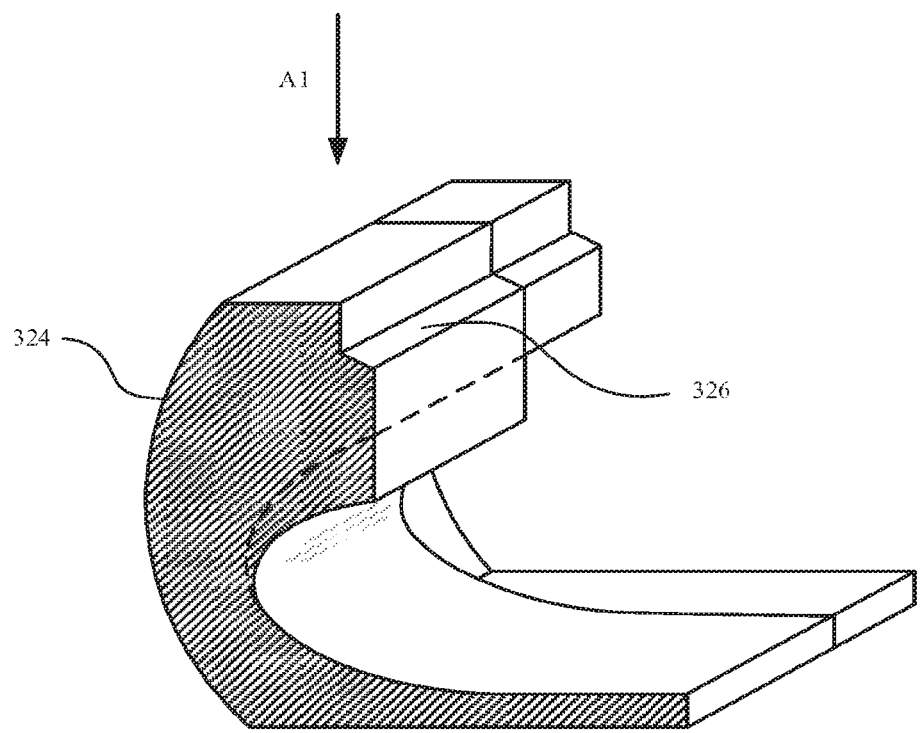
FIG. 18 illustrates an embodiment of the first ridge feature shown in FIG. 17 formed from additional material such that an area beneath the first ridge feature includes a greater thickness than that of the previous embodiment (shown in FIG. 17)

In order to provide additional support to first ridge feature 326 without changing its material makeup, several techniques may be used. For example, FIG. 18 illustrates an embodiment of first ridge feature 326 shown in FIG. 17 formed with additional material such that an area beneath first ridge feature 326 includes a greater thickness than that of the previous embodiment (shown in FIG. 17). The dotted line illustrates a region or volume below which additional material is added to first outer material 324 (as compared to the embodiment in FIG. 17). In this manner, first ridge feature 326 may be designed to withstand a load having a force in the direction denoted by the arrow, A1.

Figure 19:
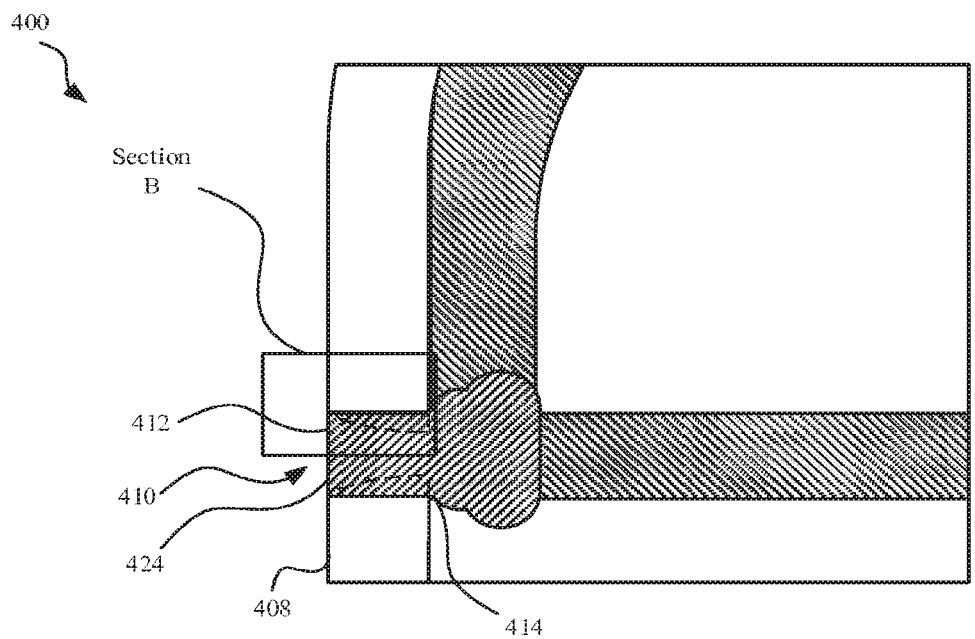
FIG. 19 illustrates a plan view of an enlarged area of an interior portion of an electronic device having an extension within an opening, in accordance with the described embodiments.
Figure 20:
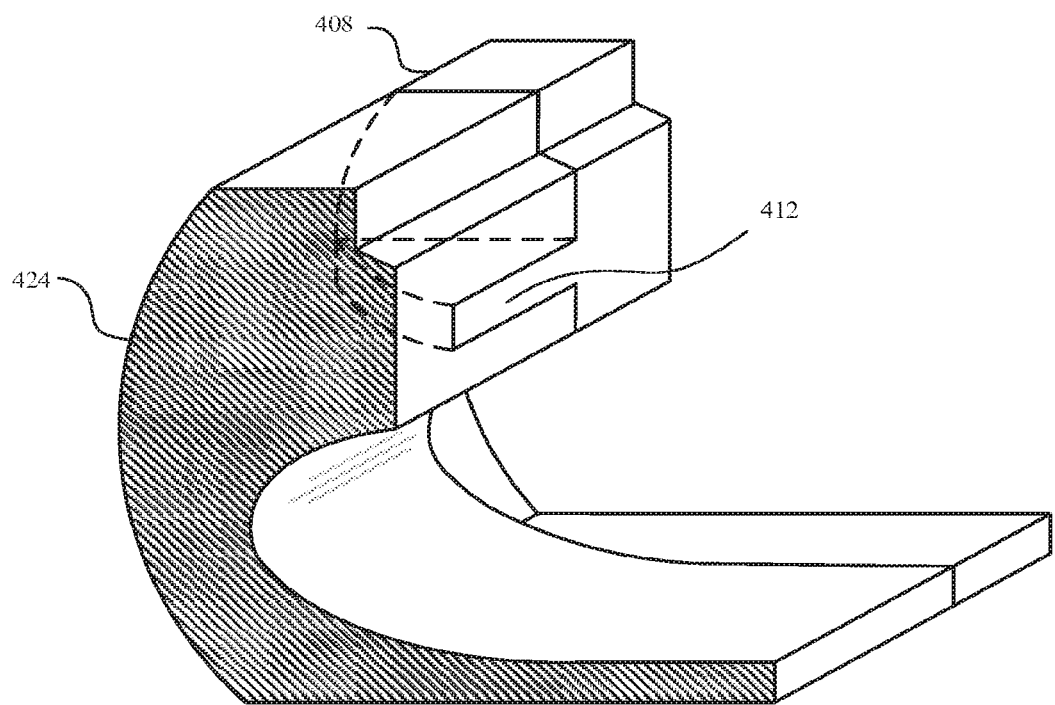
FIG. 20 illustrates an isometric view of a region enclosed by Section B shown in FIG. 19, showing the first outer material and an upper sidewall having an extension that extends into the first outer material.

FIGS. 19 and 20 illustrate an embodiment of device 400 showing a different technique for providing additional structural support to first outer material 424, in accordance with the described embodiments. For example, sidewall 408 may include a material removal process within opening 410 such that first extension 412 and second extension 414 are formed within opening 410. In other words, first extension 412 and second extension 414 are integrally formed with sidewall 408, and accordingly, are formed from the same material as the enclosure and sidewall 408. In some embodiments, first extension 412 and second extension 414 include a dovetail configuration around which first outer material 424 may be filled or molded.

FIG. 20 illustrates an isometric view of a region enclosed by Section B shown in FIG. 19, showing first outer material 424 and sidewall 408. Sidewall 408 may include first extension 412 that extends into first outer material 424. Due to the machining process used to form first extension 412, first extension 412 is integrally formed with sidewall 408. As a result, first extension 412 is also formed from a metal material (e.g., aluminum). Accordingly, first extension 412 may provide additional structural support to first outer material 424.

Figure 21:
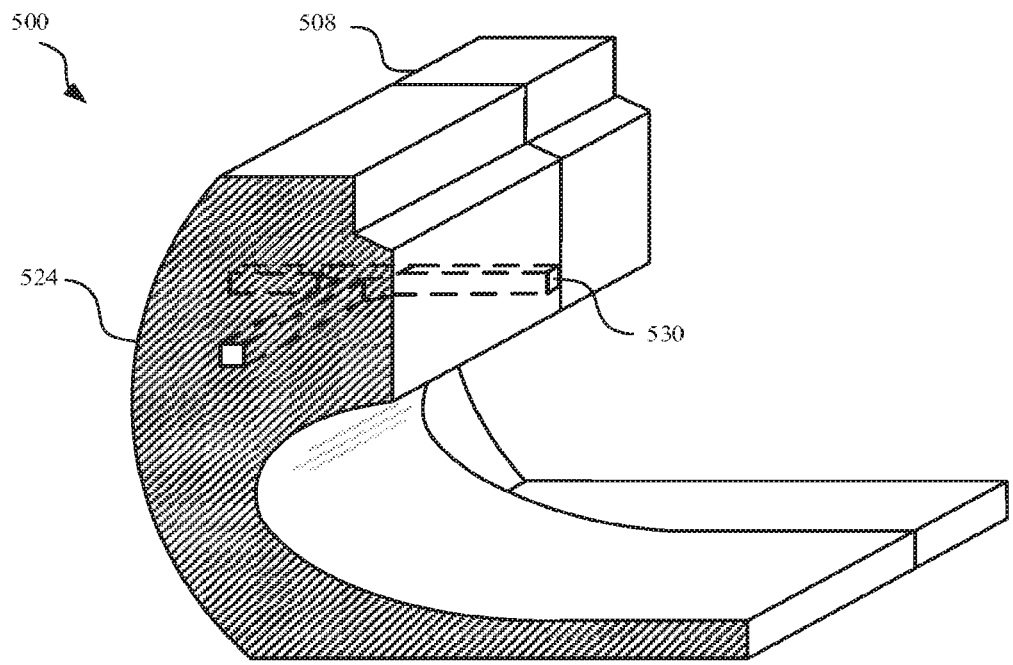
FIG. 21 illustrates an isometric view of a region similar to that of the region enclosed by Section B shown in FIG. 19, showing a gusset member insert molded into the first outer material.
Figure 22:
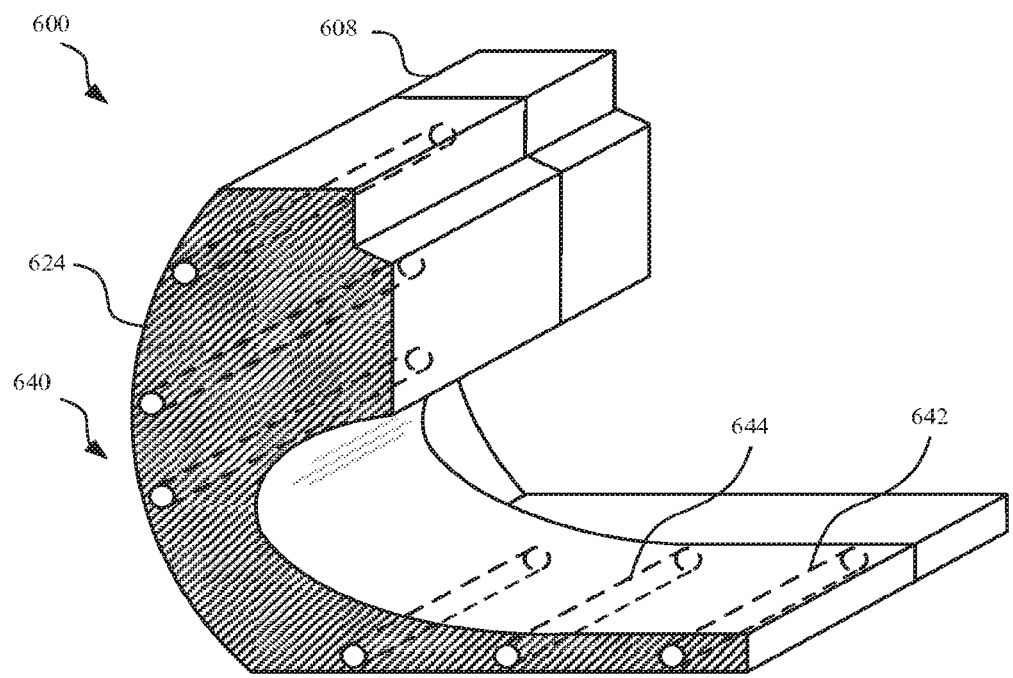
FIG. 22 illustrates an isometric view of a region similar to that of the region enclosed by Section B shown in FIG. 19, showing several rod members insert molded within the first outer material.

FIGS. 21 and 22 illustrate alternate embodiments showing techniques designed to provide structural support to an opening (such as opening 410, shown in FIG. 19), in accordance with the described embodiments. FIG. 21 illustrates an isometric view of a region similar to that of the region enclosed by Section B shown in FIG. 19, showing gusset member 530 insert molded into first outer material 524. Gusset member 530 may be secured to sidewall 508 and be made from rigid materials such as metal or hard plastic. FIG. 22 illustrates an isometric view of a region similar to that of the region enclosed by Section B shown in FIG. 19, showing several rod members 640 insert molded within first outer material 624. Rod members 640, which include first rod member 642 and second rod member 644, may be secured to sidewall 608. In some embodiments, several cavities are formed within sidewall 608 configured to receive rod members 640. Also, rod members 640 may be made from any material, or materials, generally known to be non-electrically conductive. It will be appreciated that the techniques described in FIGS. 19-22 may be used in any one of the four split regions generally associated with an enclosure.

Figure 23:
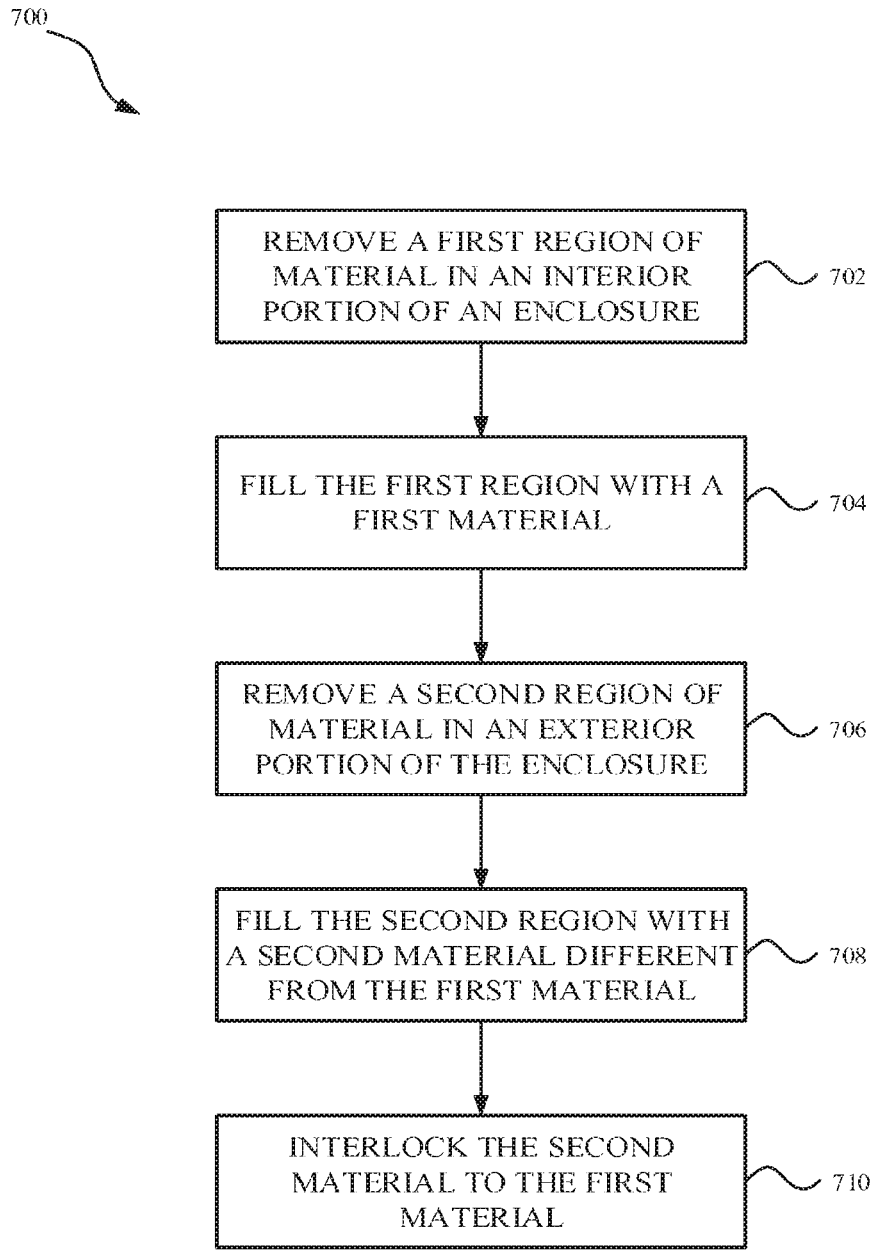
FIG. 23 illustrates a flowchart showing a method for assembling an electronic device.

FIG. 23 illustrates a flowchart 700 showing a method for assembling an electronic device. In step 702, a first region of material is removed from an interior portion of an enclosure. The first region may be a channel extending along the enclosure proximate to a location associated with the positioning of a radio antenna of the electronic device.

In step 704, the first region is filled with a first material. In some embodiments, the first material includes a composition of materials selected from a plastic combined with particles that includes glass, metal (e.g., aluminum), or a combination thereof. Also, the first material may be configured to allow the radio antenna to transmit or receive EM waves.

In step 706, a second region of material is removed from an exterior portion of the enclosure. The exterior portion is associated with an outer surface generally visible, and may be referred to as a portion opposite the interior portion. The second region may be a channel extending around the enclosure proximate to a location associated with the positioning of the radio antenna of the electronic device.

In step 708, the second region is filled with a second material different from the first material. The second material may be a relatively thin material configured to provide a cosmetic finish, and may be one of a variety of colors. Also, the second material is formed substantially from plastic, and is less rigid and less stiff as compared to the first material. Also, the second material may be engaged with the first material at an interface region. In this manner, the first material and the second material may combine to allow the radio antenna to transmit or receive EM waves, while also allowing for the enclosure to be formed substantially from a metal material, such as aluminum.

In step 710, a means for interlocking the second material to the first material is provided. In some embodiments, the means include a cavity including a threaded region in the cavity. The second material may occupy the second region as well as the cavity and the threaded region. In some embodiments, the means include a rod member that provides a tension, or pre-tension, to the first material. The tension may offset a load incurred by the enclosure and/or second material. Further, in some embodiments, several rod members may be used. The rod members may interlock the first material to the enclosure and/or the second material, thereby providing for additional structural support.

Figure 24:
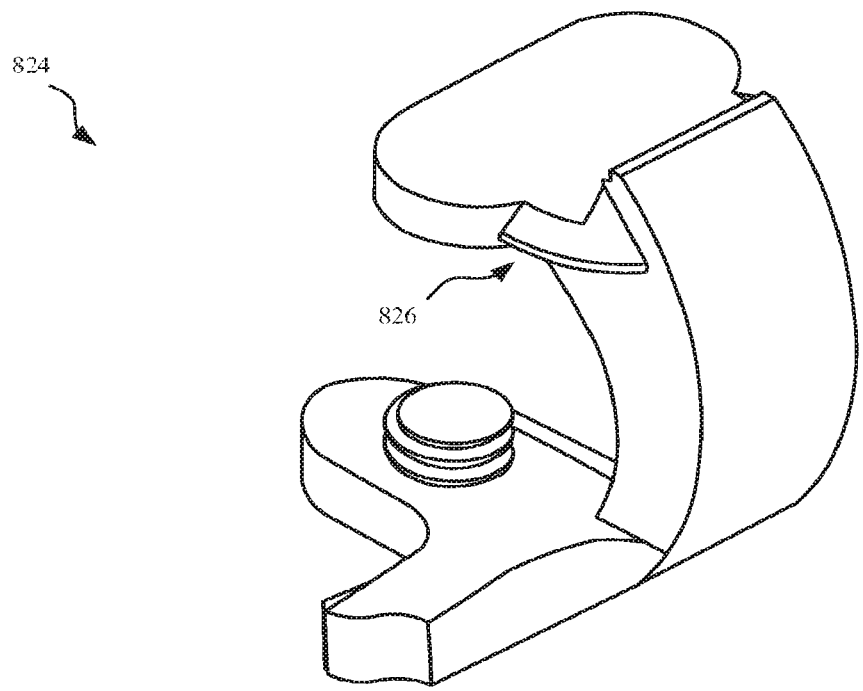
FIG. 24 illustrates an isometric view of a portion of a first outer material having an extension, in accordance with the described embodiments.
Figure 25:
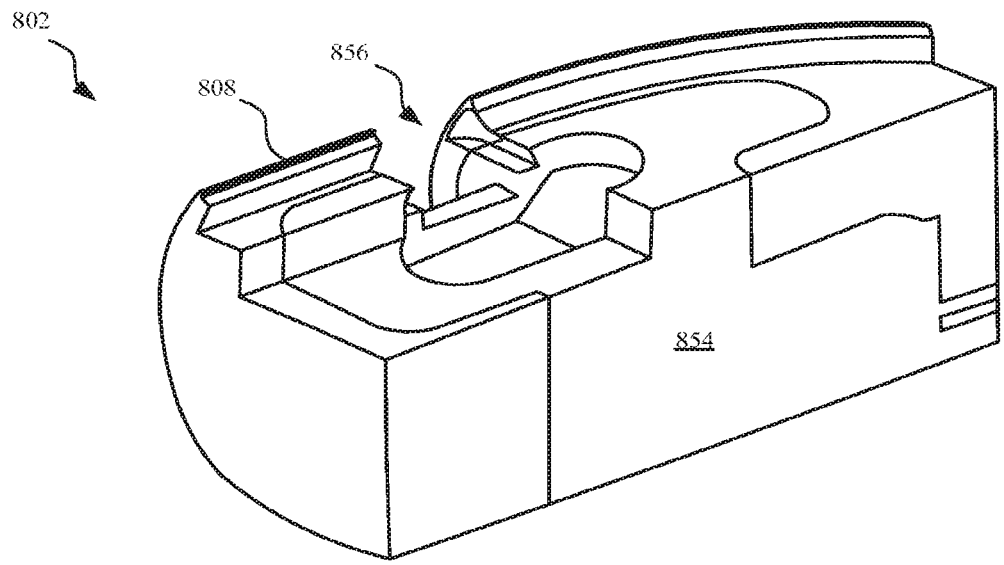
FIG. 25 illustrates an isometric view of an enlarged portion of an enclosure with a first inner material molded into the enclosure, with the first inner material and the enclosure having material removed to receive the first outer material.

FIGS. 24 and 25 illustrate an alternative of an electronic device, and in particular, by first inner material 854, in accordance with the described embodiments. FIG. 24 illustrates an isometric view of a portion of first outer material 824. In some embodiments, extension 826 is includes a dovetail configuration. Also, in some embodiments, extension 826 is formed by insert molding a rigid material (e.g., plastic) that produces a desired shape (e.g., dovetail). In other embodiments, extension 826 is formed during an alternate molding process of first outer material 824 into the enclosure. Also, extension 826 may extend in another direction to form a symmetrical shape around first outer material 824 (i.e., two dovetails).

FIG. 25 illustrates an isometric view of an enlarged portion of enclosure 802 with first inner material 854 molded into enclosure 802. Subsequent to molding first inner material 854 into enclosure 802, enclosure 802 and/or first inner material 854 may include a material removal process (e.g., CNC cutting) in order to receive a portion of first outer material 824 (shown in FIG. 24). For example, region 856 may be removed by removing material from enclosure 802 (in particular, sidewall 808 of enclosure 802) and first inner material 854. In this manner, extension 826 (shown in FIG. 24) may be molded or formed within region 856. As a result, first outer material 824 may be further secured to enclosure 802. This allows for first outer material 824 to better withstand load-bearing events and reduce instances of first outer material 824 deflecting away from enclosure 802. Generally, region 856 may be formed with any desired shape to form a corresponding shape of extension 826.

Figure 26:
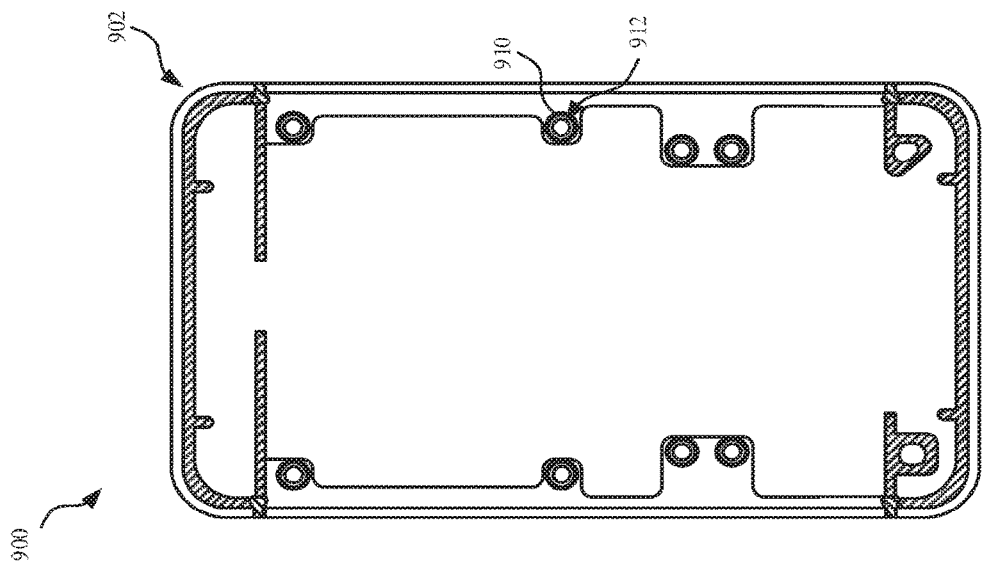
FIG. 26 illustrates an embodiment of an electronic device having an enclosure using several protrusions as fasteners, in accordance with the described embodiments.

In addition to using anodized fiducials, other methods and techniques may be used to align internal components as well as reduce the overall footprint of alignment features. For example, FIG. 26 illustrates an embodiment of electronic device 900 having enclosure 902 using several protrusions as fasteners, in accordance with the described embodiments. Traditional devices include protrusions (used for aligning an internal component during assembly) positioned proximate to openings (used for receiving a fastener to secure the internal component). This uses additional, unnecessary space within enclosure 902. However, in this embodiment, the protrusions are positioned within the openings while still providing alignment to, for example, an automated assembly process that uses a vision system to determine the location of the protrusion. Further, the protrusions also include openings used to receive a fastener. In other words, the protrusions serve a dual purpose: alignment and fastening. In some embodiments, the openings include an internal threaded region configured to receive a fastener (e.g., screw) used to secure the internal component (e.g., main logic board). FIG. 26 shows enclosure 902 having an exemplary first protrusion 910 having first cavity 912 with an internal threaded region.

Figure 27:
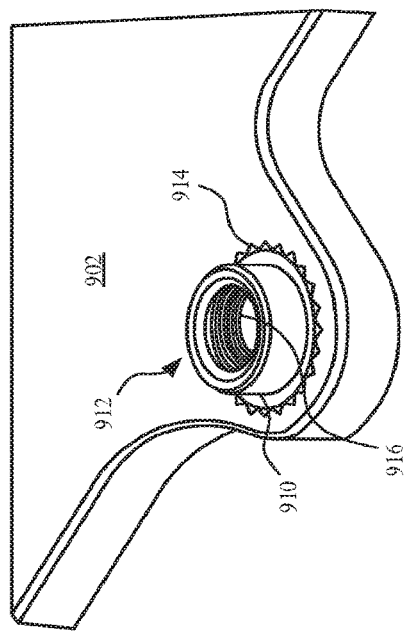
FIG. 27 illustrates an isometric view of the enclosure having a first protrusion secured within a first fastening member.

FIG. 27 illustrates an isometric view of enclosure 902 having first protrusion 910 secured within fastening member 914. In some embodiments, fastening member 914 is a nut having a sleeve. Also, first protrusion 910 includes first cavity 912 having internal threaded region 916 configured to receive a fastener (not shown). In other embodiments, first cavity 912 does not include an internal threaded region in order to secure an unthreaded fastener (e.g., rivet). In this configuration, fastening member 914 and first protrusion 910 provide for alignment means of an internal component, and also a securing means for the internal component. This allows the internal component to include additional area for additional features.

Figure 28:
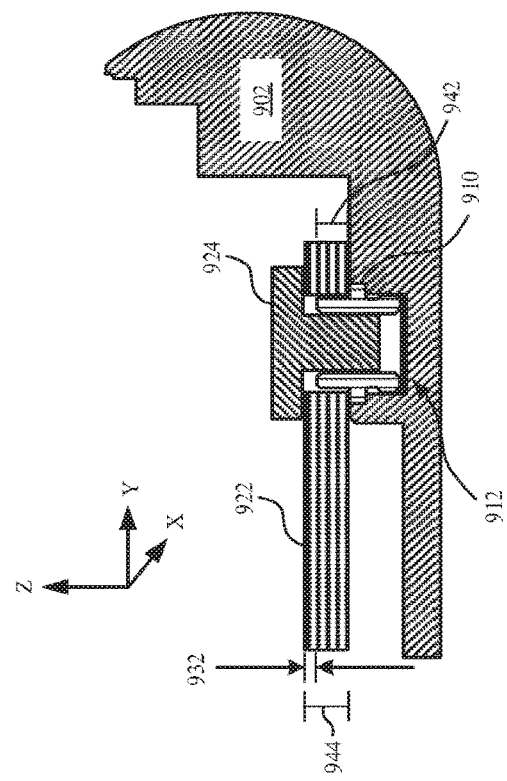
FIG. 28 illustrates a cross sectional view showing an internal component secured to the enclosure via a first fastener.

FIG. 28 illustrates a cross sectional view showing a portion of internal component 922 secured to enclosure 902 via fastener 924. In some embodiments, fastener 924 is a boss. Fastener 924 may include a threaded region configured for threaded engagement with an internal threaded region of first cavity 912. First protrusion 910 and fastener 924 include certain relationships to ensure internal component 922 is properly secured. For example, a dimension 932, or gap, between a lower portion of fastener 924 and an upper portion of first protrusion 910 ensures that when fastener 924 is secured to first protrusion 910, internal component 922 is engaged with both enclosure 902 and fastener 924. Also, as shown in FIG. 28, fastener 924 includes a dimension 942 (e.g., height in a z-direction) extending above enclosure 902. This dimension 942 includes a height or thickness less than a height or thickness of dimension 944 of internal component 922. In this manner, fastener 924 may be secured to first protrusion 910 in a manner such that fastener 924 contacts internal component 922 to better secure internal component 922 to enclosure 902.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An enclosure, comprising:
a first part defining:
a first portion of an exterior side surface of the enclosure; and
a first portion of an interior surface of the enclosure;
a second part defining:
a second portion of the exterior side surface of the enclosure;
a portion of an exterior back surface of the enclosure; and
a second portion of the interior surface of the enclosure;
a first joining element between the first part and the second part; and
a second joining element, between the first part and the second part, defining a third portion of the exterior side surface of the enclosure and mechanically interlocked with the first part and the second part.

2. The enclosure of claim 1, wherein:
the first part defines a threaded recess; and
the second joining element engages the threaded recess to form the mechanical interlock.

3. The enclosure of claim 1, wherein the first joining element is mechanically interlocked with the second part.

4. The enclosure of claim 1, further comprising a reinforcing member encapsulated partially in the first joining element and partially in the second joining element.

5. The enclosure of claim 1, further comprising a reinforcing member secured to the first part and at least partially encapsulated in the first joining element, thereby retaining the first joining element to the first part.

6. The enclosure of claim 5, wherein:
the reinforcing member is a first reinforcing member; and
the enclosure further comprises a second reinforcing member secured to the second part and at least partially encapsulated in the first joining element, thereby retaining the first joining element to the second part.

7. The enclosure of claim 1, wherein the first part is electrically isolated from the second part by the first and second joining elements.

8. A mobile phone, comprising:
an enclosure defining an internal volume and comprising:
a first part defining:
a first sidewall defining a first portion of an exterior side of the enclosure; and
a first interlock feature;
a second part electrically isolated from the first part and defining:
a back side of the enclosure; and
a second sidewall defining a second portion of the exterior side of the enclosure and defining a second interlock feature;
a first joining element occupying a first portion of a region between the first sidewall and the second sidewall; and
a second joining element occupying a second portion of the region between the first sidewall and the second sidewall and engaged with the first and second interlock features;
a processor positioned in the internal volume; and
a display positioned in the enclosure and defining an input surface of the mobile phone.

9. The mobile phone of claim 8, wherein the second joining element defines a third portion of the exterior side of the enclosure between the first and second portions of the exterior side of the enclosure.

10. The mobile phone of claim 9, wherein the first, second, and third portions of the exterior side of the enclosure define a continuous surface.

11. The mobile phone of claim 8, wherein:
the first and second parts comprise a metal material;
the first and second joining elements comprise a plastic material; and
the mobile phone further comprises an antenna positioned in the internal volume and configured to transmit electromagnetic signals through the first and second joining elements.

12. The mobile phone of claim 8, wherein the first interlock feature comprises a blind hole.

13. The mobile phone of claim 12, wherein the first interlock feature further comprises threads formed in the blind hole.

14. The mobile phone of claim 12, wherein the first joining element and the second joining element mechanically retain the first part to the second part.

15. An enclosure, comprising:
- a first part having a first recess formed therein and defining:
  - a first portion of an exterior side of the enclosure; and
  - a first portion of an interior of the enclosure;
- a second part having a second recess formed therein and defining:
  - a second portion of the exterior side of the enclosure;
  - a portion of a back of the enclosure; and
  - a second portion of the interior of the enclosure;
- a first joining element between the first part and the second part; and
- a second joining element defining a third portion of the side of the enclosure and mechanically interlocked with the first part and the second part and comprising:
  - a first extension engaged with the first recess; and
  - a second extension engaged with the second recess.

16. The enclosure of claim 15, wherein:
- the first joining element defines a third recess that communicates with the first recess to form a channel; and
- the first extension is further engaged with the third recess.

17. The enclosure of claim 16, wherein:
- the channel is a first channel;
- the first joining element defines a fourth recess that communicates with the second recess to form a second channel; and
- the second extension is further engaged with the fourth recess.

18. The enclosure of claim 15, wherein:
- the exterior side of the enclosure is a first exterior side;
- the first part further defines a first portion of a second exterior side of the enclosure opposite the first exterior side; and
- the second part further defines a second portion of the second exterior side of the enclosure.

19. The enclosure of claim 18, wherein the second part further defines a third exterior side of the enclosure.

20. The enclosure of claim 19, wherein:
- the enclosure further comprises a third part defining a fourth exterior side of the enclosure; and
- the second and third parts are u-shaped bands having substantially identical external dimensions.

* * * * *